May 12, 1936.  C. B. AUSTIN  2,040,422
FOCUSING AND FINDING ATTACHMENT FOR CAMERAS
Filed Nov. 5, 1934  2 Sheets-Sheet 1
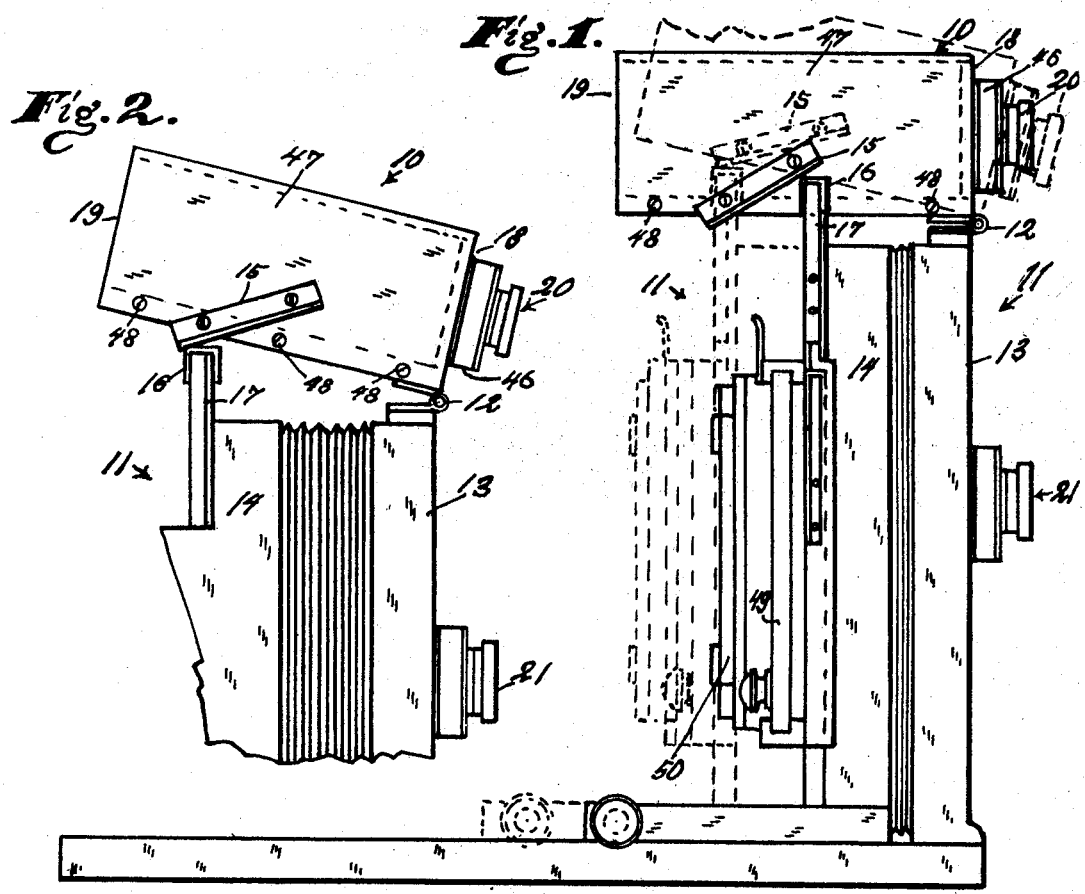
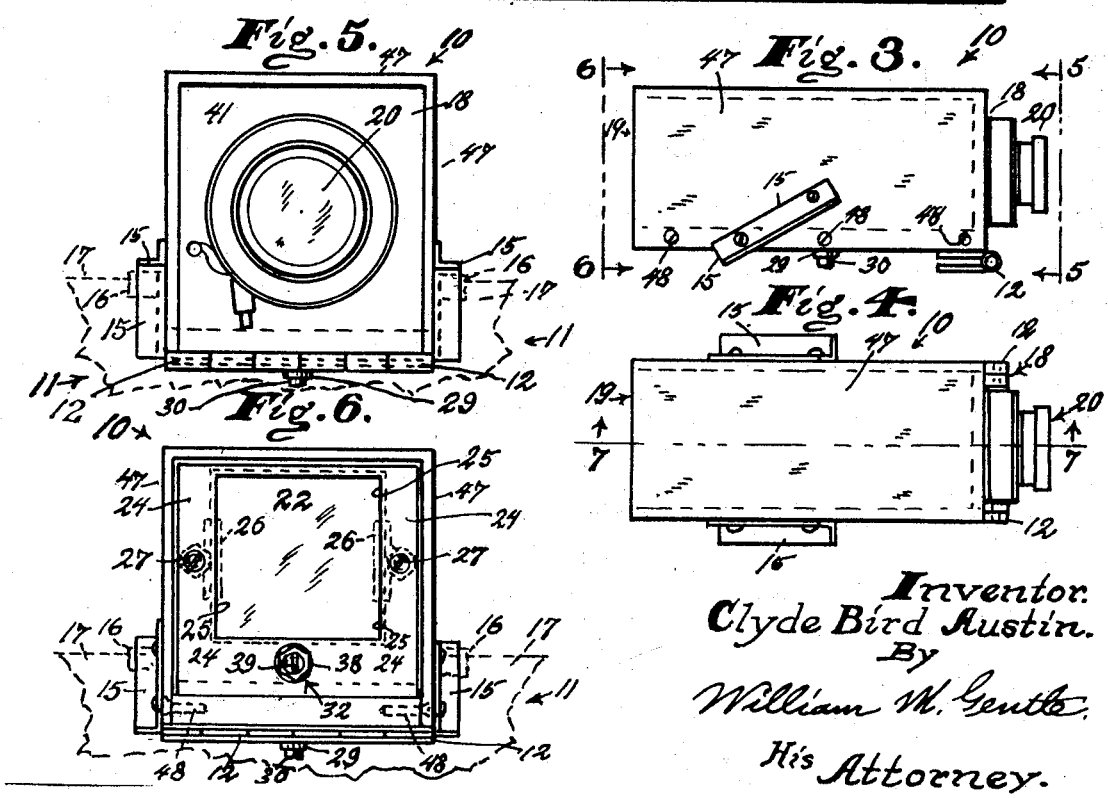
Inventor.
Clyde Bird Austin.
By William M. Gentle,
His Attorney.

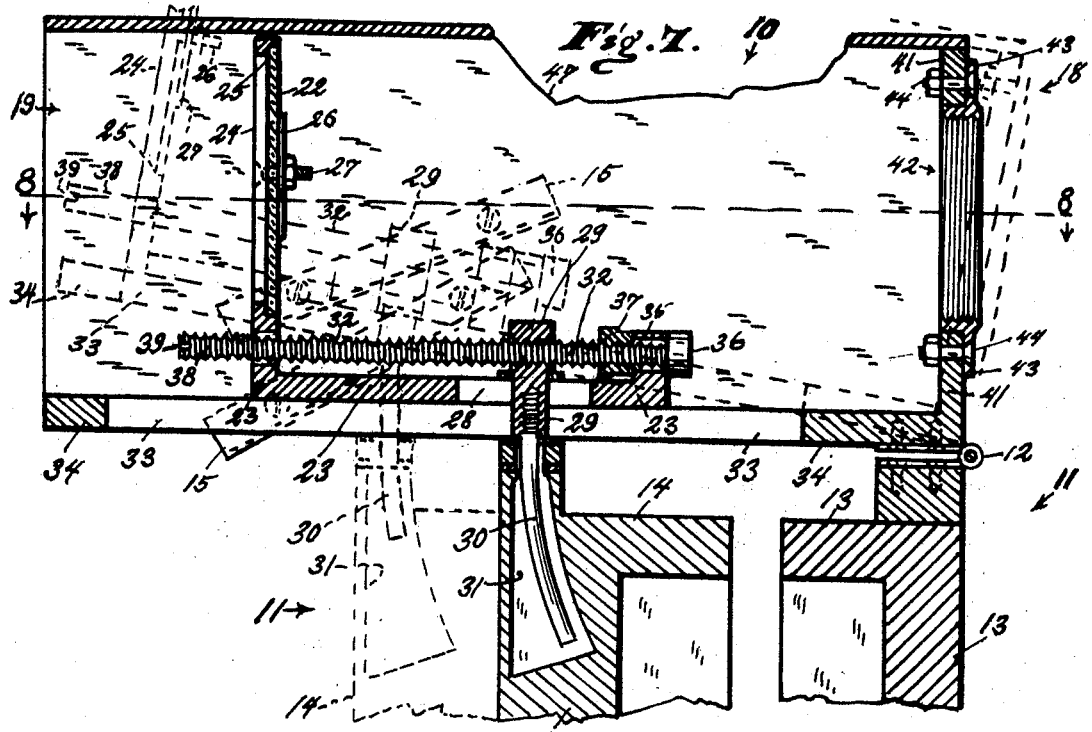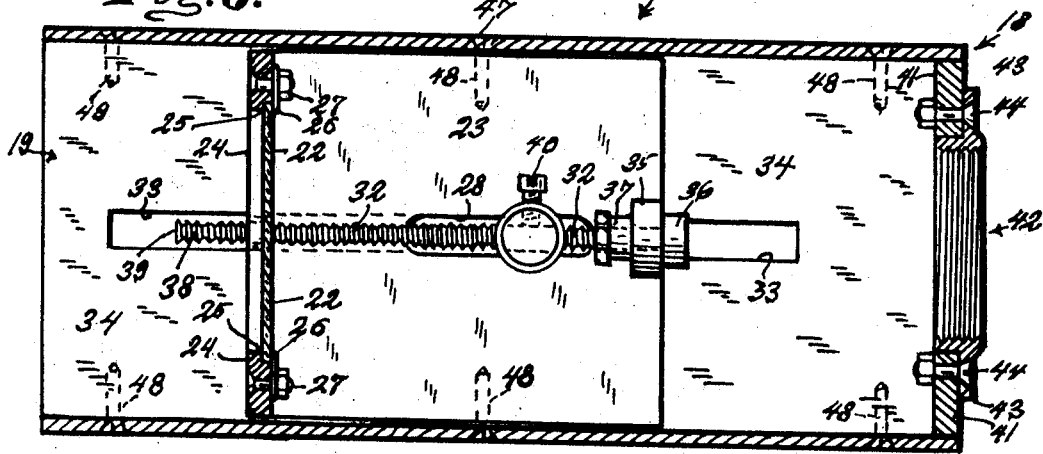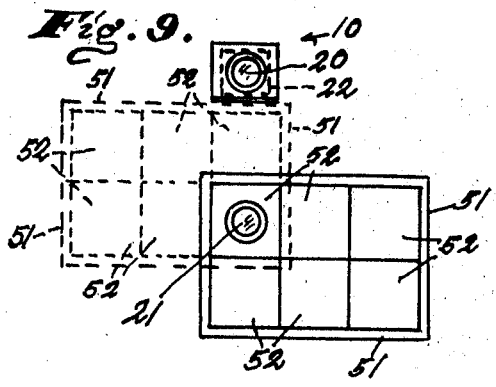

Patented May 12, 1936

2,040,422

UNITED STATES PATENT OFFICE 2,040,422

FOCUSING AND FINDING ATTACHMENT FOR CAMERAS

Clyde Bird Austin, Los Angeles, Calif.

Application November 5, 1934, Serial No. 751,613

8 Claims. (Cl. 95—37)

This invention relates to a focusing and finding attachment for cameras and the principal object is to provide an attachment for multiple-back cameras that an image being repeatedly photographed in different positions on a single film is continuously visible to the photographer so he can see that the object remains in a proper position relative to the film, and in focus therewith during the operation of changing the position of the film holder and making the plurality of exposures.

An object of this invention is to provide an attachment for a multiple-back camera that will save time and avoid trouble in the operation of making a plurality of exposures at designated spaces on a single film in the respect that with this attachment it is not necessary as heretofore to remove the film holder each time an exposure is made to refocus and rearrange the object in a proper or desired position as the focusing and rearrangement of the object in position are done through the ground glass of the attachment so that at all times during the operation of making a plurality of exposures the object is clearly visible to the photographer, so he can instantly pause in the operation if the object has moved out of focus or position, thereby saving time and avoiding trouble.

In other words, the focusing of the object and arranging it in a desired position, is not made through the main ground glass of the camera but through a small ground glass in the attachment so that it is not necessary as formerly to remove the film holder after an exposure is made for rearranging the object, thereby saving considerable time in operation.

A feature of invention is shown in the construction and arrangement of parts in the attachment, whereby it is automatically adjusted into proper focus with the object as circumstances require that the camera be lengthened or shortened. That is, as the camera is lengthened the small ground class in the attachment is correspondingly moved away from the attachment lens and vice versa, and also the attachment is moved in an arc so that the distance at which the lights of the attachment lens and the camera lens converge decreases as the attachment moves up in an arc, and correspondingly increases as it is moved downward.

A feature of invention is shown in the construction of the slide on which the small ground glass of the attachment is mounted, whereby it can be adjusted toward or from the attachment lens, as may be necessary when first assembling the parts or later to compensate for wear in use.

Other objects, advantages and features of invention may appear from the accompanying drawings and description thereof.

The accompanying drawings illustrate my invention, in which:

Figure 1 is a side view of a multiple-back camera with an attachment connected thereto that is constructed in accordance with this invention with many of the parts indicated semidiagrammatically and an altered position shown by dotted lines.

Fig. 2 is a fragmental side view of the camera and attachment in altered position analogous to the dotted position shown in Fig. 1.

Fig. 3 is a side view of my attachment detached from the camera with a centering bar broken away.

Fig. 4 is a plan view of my attachment.

Fig. 5 is a slightly enlarged end view of my attachment as seen from the line 5—5 of Fig. 3.

Fig. 6 is a view of the other end of my attachment as seen from the line 6—6 of Fig. 3.

Fig. 7 is an enlarged fragmental sectional view as taken on the line 7—7 of Fig. 4, with the attachment lens removed and showing a fragmental portion of the camera to which my attachment is pivotally connected also showing an altered position of my attachment by dotted lines.

Fig. 8 is a section on line 8—8 of Fig. 7.

Fig. 9 is a diagrammatic view of a multiple film as associated with my attachment lens and the camera lens, indicating that all six spaces on the multiple film can be moved into focusing position without removing the film holder from the camera.

My invention includes an attachment 10 for the multiple-back camera 11; and it is preferably pivotally connected thereto by a hinge 12 that is secured to the front stationary or lens section 13 of the camera casing so the attachment can move in an arc when the rear movable section 14 of the camera casing is moved either toward or away from the front section.

The attachment 10 has the cam plates 15 secured to its sides so they rest on clips 16 that are secured to upward extensions 17 on the movable section 14 of the camera and are arranged so that when the movable section, 14 is moved away from the front section 13 the attachment will be moved in an arc with its lens 18 downward and its ground glass end 19 upward, and vice versa, and the purpose of thus actuating the attachment 10 is to keep its auxiliary lens 20 continuously in focus with the camera lens 21 so that at all times the focusing of the camera is done through the attachment by movement of the camera, and not as formerly through the camera.

In addition to the camera moving the attachment 10 in an arc to keep its auxiliary lens 20 in focus with the camera lens the camera also moves a small auxiliary ground glass 22 in the attachment toward or from the auxiliary lens 20 in proportion to the movement of the rear section of the camera casing toward or from the front lens section so the image of the object or scene being photographed will appear clearly thereon for focus and position thereof. That is, the rear section of the camera is connected to a sliding base plate 23 so it automatically moves the plate when moved toward or from the front section, and this sliding plate carries a vertical frame plate 24 having a rectangular opening therethrough with a seat 25 therein for the ground glass 22 which is held in place by the clips 26 and screw bolts 27.

The plate 23 has a slot 28 through which a post 29 is extended, and this post has a concentric rod 30 secured to its bottom end that extends downwardly into a recess 31 in the section 14; and the post 29 is connected to the slide plate 23 by a screw 32 so that when the section 14 is moved toward or from the front section 13 it will, through a pressure on the concentric rod 30 correspondingly and automatically move the ground glass 22 toward or from the lens 20.

There is an elongated slot 33 in the base 34 of the attachment 10 that is in register with the slot 28 through which the post 29 also extends so that the parts just mentioned can move as described.

The plate 23 has a boss 35 at its forward end through which the screw 23 is extended so its head 36 engages one side of the boss and there is a lock nut 37 on the other side that holds the screw from endwise movement in the boss, but is free to rotate. This screw is threaded through the post 29 and also loosely extended through the base of the vertical plate 24, and the purpose of this screw 32 is to manually adjust the ground glass 22 toward or from the lens 20 to bring them into proper focus; and the rear end 38 of this screw is slotted at 39 so it can be engaged by a tool such as a screw-driver, to adjust the parts as stated.

A set screw 40 is engaged to lock the screw 22 in the post 29 when the parts are properly adjusted.

At the forward end of the base 34 of the attachment 10 there is an upright rectangular plate 41 integral with the base, that has a center opening 42 in which a lens frame 43 is secured by screw bolts 44, and this frame has a threaded opening 45 therethrough in which the lens housing 46 is secured.

The lens 20 and housing 46 are old and for that reason are not shown or described in detail.

The attachment 10 includes a three-sided housing 47 that encloses the interior parts of the attachment and is secured to the base 34 by screws 48. This housing is removable so that the interior parts can be reached for replacement, adjustment and repair.

Preferably I use my attachment with a camera known in the trade as an Eastman Multiple-Back camera that is constructed so its film holder 49 can be shifted a predetermined distance both vertically and horizontally so a photographer can make a plurality of exposures on a single film.

The film holder 49 and ground glass frame 50 and associated parts are old and well understood, and for that reason are only indicated diagrammatically in Fig. 1. Heretofore it has been necessary to remove the film holder after each exposure has been made so a repositioning and focusing of the object or scene could be made through the large ground glass of the camera.

With my invention it is not necessary now to remove the film holder when a plurality of exposures is to be made on a single film for, as previously stated and described, the focusing of the camera and arranging it in proper position to the object or scene is done through my attachment.

The making of a plurality of exposures on a single film is diagrammatically illustrated in Fig. 9. As seen therein a multiple film 51 is indicated as divided into six equal spaces 52 in which an exposure can be made. In reality these dividing lines do not appear on the film, but the camera is constructed so the film can be shifted vertically and horizontally and centered over each space.

This shifting mechanism is also old and not shown or described in detail.

From the arrangement of parts in Fig. 9 it can readily be seen that with the lenses 20 and 21 focused on an object or screen the subject will be continuously visible through the small ground glass 22 back of the lens 20 so that if the object or scene gets out of focus or a proper position in shifting the film holder from space to space, the operation can be instantly detected through the attachment and corrected before another exposure is made.

In operation the attachment is pivotally connected to the camera so its lens is in focus with the camera lens and also so its ground glass is in proper focus, after which a film holder and film are inserted in the rear section of the camera in the usual way. The camera is then focused on an object by looking through the attachment which is moved automatically while the rear section of the camera is moved toward or from the front section; the connection of the attachment to the camera being of such a nature that a movement of the rear section, as stated, automatically keeps its lens in focus with the camera and adjusts the ground glass of the attachment.

I claim as my invention:

1. An attachment for a camera having a lens, a ground glass and film movable toward and from said lens, a base plate pivotally connected to said camera, an auxiliary lens supported at one end of said plate that is in focus with the lens of said camera, an auxiliary ground glass supported adjacent the other end of said plate, and automatic means for moving said base plate in an arc when the ground glass of said camera is moved toward or from its lens to maintain a constant focus between said lenses and also to automatically move the ground glass of said attachment toward or from said auxiliary lens.

2. An attachment for a camera having a rear section movable toward and from a front section, a base plate to said attachment pivotally connected to the camera, an auxiliary lens supported at one end of said plate, an auxiliary ground glass supported adjacent the other end of said plate, manual means for adjusting said ground glass toward or from said lens, and automatic means for moving said ground glass toward or from said lens also in an arc when the rear section of said camera is moved toward or from the front section.

3. An attachment for a camera including a base plate having a lens support at its forward end, a lens in said support, a sliding plate mounted on said base plate, a frame plate at the rear end of said sliding plate, a ground glass in said frame plate, a screw for manually adjusting said ground glass toward or from said lens, a hinge connection between said base plate and a camera, and means whereby said ground glass is automatically moved toward or from said lens and also moved in an arc with said lens when the camera to which said base plate is attached is lengthened or shortened to focus it on a scene or object.

4. In an attachment for a camera the combination with a housing, a slotted base plate therein, a lens support on the forward end of said plate, a lens in said support, a slotted sliding plate mounted on said base plate so their slots are in register, a frame plate integral with the rear end of said sliding plate, a ground glass in said frame plate, a screw on said sliding plate for manually adjusting said ground glass toward said lens, cam plates secured to the sides of said housing, a camera to which said base plate is pivotally secured, a lens in said camera, a post extended from said camera up through the slots of said base and sliding plates that has said screw extending through its upper end, an eccentric rod secured in the lower end of said post and extended down into a recess in said camera, and extensions on said camera that engage said cams, said parts arranged so that when said camera is lengthened or shortened to focus its lens on a scene or object said housing will be moved in an arc and its ground glass moved toward or from its lens to continuously keep them in focus with the camera lens.

5. In an attachment for a camera the combination with a housing, a slotted base plate therein, a lens support on the forward end of said plate, a lens in said support, a slotted sliding plate mounted on said base plate so their slots are in register, a frame plate integral with the rear end of said sliding plate, a ground glass in said frame plate, a screw on said sliding plate for manually adjusting said ground glass toward said lens, cam plates secured to the sides of said housing, a camera to which said base plate has its forward end pivotally secured, a lens in said camera, a ground glass in said camera, a shifting film holder in said camera, a multiple film in said holder, a post extending from said camera up through the slots in said base and sliding plates that has said screw extended through its upper end to aid in adjusting the ground glass of said attachment toward or from the attachment lens, and eccentric rod on the lower end of said post that is extended down into a recess in said camera, and extensions on said camera that engage said cams, said plates arranged so that when said camera is lengthened or shortened to focus its lens on a scene or object said housing will be moved in an arc and its ground glass toward or from its lens to continuously keep them in focus with the camera lens and also so that the scene or object will be continuously visible through said attachment so said multiple film can be shifted from place to place without removing the holder from the camera.

6. In a focusing and finding attachment for a camera the combination with a camera having front and rear sections, a lens in the front section of said camera, an attachment pivotally connected to the front section of said camera, a lens in said attachment that is in focus with said camera lens, and a connection between said attachment and the rear section of said camera whereby said attachment is moved in an arc to maintain a constant focus between said lens when the rear section of said camera is moved toward or from the front thereof.

7. The combination set forth in claim 6 with, a ground finding glass in said attachment and means whereby said ground glass is automatically moved toward or from said attachment lens in proportion to the movement of said rear section toward or from the front section of said camera.

8. An attachment for a camera having a rear section movable toward or from a front section, a base plate pivotally connected to the front section of said camera, a lens support at the forward end of said plate, a lens in said support, a sliding plate mounted on said base plate, a frame plate supported at the rear end of said sliding plate, a ground glass in said frame plate, and a connection between the rear section of said camera and attachment whereby said ground glass is automatically moved toward or from said lens and the attachment is moved in an arc when the rear section of said camera is moved toward or from the front section for the purpose specified.

CLYDE BIRD AUSTIN.